United States Patent Office 3,573,281
Patented Mar. 30, 1971

---

3,573,281
2,10 - DIOXA - 5 - AZA-TRICYCLO[6,2,1,0$^{1,5}$] UNDECANEDION-(6,9) AND 2,11-DIOXA-6-AZA - TRICYCLO[7,2,1,0$^{1,6}$]DODECANEDION-(7,10) COMPOUNDS AND THEIR PREPARATION

Rudolf Nehring, Marl, Germany, assignor to Chemische Werke Huls Aktiengesellschaft, Marl, Germany
No Drawing. Filed Sept. 20, 1968, Ser. No. 761,334
Claims priority, application Germany, Oct. 2, 1967, C 43,476
Int. Cl. C07d *85/78, 87/20, 87/54*
U.S. Cl. 260—239.3      5 Claims

ABSTRACT OF THE DISCLOSURE

Substituted Δ$^2$-oxazolines and 4H-5,6-dihydro-1,3-oxazines are converted into lactones containing amide groups by reacting with maleic acid anhydride, under exclusion of moisture and at a temperature of 0–180° C., from 0.2 to 1.0 mole of the maleic acid anhydride being employed per mol of the oxazoline or oxazine. The lactone products are utilizable as inhibitors of plant growth; also, as synthetic components of drugs.

---

The invention is concerned with a process for the preparation of lactones containing amide groups.

It heretofore had been proposed (see U.S. Pat. No. 2,547,494) to cause a substituted Δ$^2$-oxazoline to react with a cyclic anhydride, such as succinic acid anhydride. The reaction leads to an opening of the ring, forming an ester of N-(2-hydroxyethyl)-succinimide. It is also known, in view of U.S. Pat. No. 2,410,318, that substituted Δ$^2$-oxazolines will react with carboxylic acid anhydrides, thereby forming N,O-diacylated 2-aminoethanols. Again the Δ$^2$-oxazoline ring becomes unlinked during the course of the reaction.

It has now been found that it is possible to convert compounds of the general formula

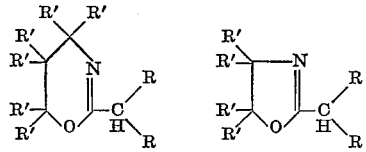

wherein R represents aliphatic radicals with up to 5 C-atoms, aromatic, cycloaliphatic and araliphatic radicals, and R' represents saturated and unsaturated aliphatic, aromatic radicals or hydrogen atoms, whereby not more than three of the radicals R' can be substituents, with the remainders being hydrogen to lactones of the general formula

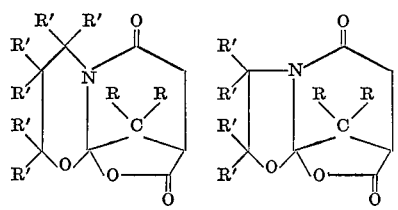

wherein R and R' have the above listed meaning, if said compounds are allowed to react with 0.2 to 1 mol of maleic acid anhydride, under conditions excluding moisture and at temperatures ranging from 0 to 180° C., said molecular weight being related to the heterocyclic compound employed.

In view of the current state of art it was not to be expected, but rather was most surprising, that the reaction would take place without the unlinking of the Δ$^2$-oxazoline ring.

Suitable substituted Δ$^2$-oxazolines for the process of the present invention are, for example: 2-isopropyl-; 2-isopropyl-5-methyl-; 2-(1'-phenyl)-propyl-; 2-(1'-phenyl)-propyl-5-methyl-; 2-(1'-cyclohexyl) - propyl-; 2-diphenylmethyl; 2-(1'-ethyl)-propyl-; 2-(1'-ethyl)-propyl-5-methyl-; 2-(1'-ethyl)-pentyl-, 2-(1'-ethyl)-pentyl-5-methyl-; 2-(1'-methyl) - butyl- and 2-(1'-methyl)-butyl-5-methyl-Δ$^2$-oxazoline. Suitable 4H-5,6-dihydro-1,3-oxazines are: 2-isopropyl-; 2-isopropyl - 4,6,6-trimethyl-; 2-isopropyl-4,6-dimethyl-6-phenyl-; 2-isopropyl-6-methyl-6-phenyl-; 2-isopropyl-6-vinyl-; 2 - isopropyl-4-methyl-6-vinyl-; 2 - (1'-phenyl)-propyl-; 2-diphenyl-methyl-; 2-(1'-ethyl)-propyl-; 2-(1'-ethyl)-propyl-4,6-dimethyl-6-phenyl-; 2-(1'-ethyl)-pentyl-; 2-(1'-ethyl)-4,6-dimethyl-6-phenyl-; 2-(1'-methyl)-pentyl-; 2-(1'-methyl)-butyl- and 2-(1'-methyl)-butyl-4,6-dimethyl-6-phenyl-4H-5,6-dihydro-1,3-oxazine. Preferred species for the reaction of the process proposed herein are: 2-isopropyl-; 2-(1'-ethyl)-pentyl-; and 2-isopropyl-5-methyl-Δ$^2$-oxazolines.

It is advisable to carry out the reaction under exclusion of moisture, by using the following inert solvents: tetrachloroethane; chloroform; trichloroethylene; ethylenechloride; 1,2-dichloroisobutane; 2,2'-dichloroethylether; 1-chlorobutane; 1-chlorooctane; chlorobenzene; o-dichlorobenzene; tertiary butanol and acetonitrile. The reaction can be carried out readily without the presence of a solvent; however, since the reaction develops a great amount of heat, it is advisable in many instances to carry out the process in the presence of one or another of the solvents listed.

The reactants are united at room temperature, with the reaction being carried out at temperatures ranging from 0 to 180° C., and preferably from 60 to 130° C. Upon cooling or concentrating of the reaction solution the so-formed lactones will deposit—generally, in crystalline form—and can be recrystallized for purification purposes.

The process of the invention can be carried out either batchwise or continuously. The continuous reaction can be performed advantageously by combining the two components or their solutions at the head of a reaction tower.

The resulting compounds, or their mixtures, can be utilized as inhibitors of plant growth. Due to the reactive lactone-grouping the products obtained in accordance with the invention will form versatile synthetic components to be utilized in the preparation of drugs.

The invention will now be further described with reference to the following specific examples. All "parts" specified in these examples are "parts by weight."

EXAMPLE 1

Under exclusion of moisture and with stirring there are combined a solution of 78.4 parts (0.8 mol) of maleic acid anhydride in 600 parts of absolute 1,2-dichloroethane with 90.4 parts (0.8 mol) of 2-isopropyl-Δ$^2$-oxazoline in 200 parts of absolute 1,2-dichloroethane. The mixture is then heated for 1½ hours to boiling point, and the solvent partially distilled off. The crystals which deposit after cooling are then sucked off. In this manner there are obtained 119 parts, and 9 additional parts from the mother-liquor (the total representing 77% of the computed value), of 11,11-dimethyl-2.10-dioxa-5-aza-tricyclo-[6,2,1,0$^{1,5}$]undecanedion-(6,9), the same being obtained, after washing with absolute ethylacetate, in the form of colorless crystals having a melting point of from 178 to 186° C.

The IR-spectrum of the compounds shows, in addition to the amide-CO-band at 1650 cm.$^{-1}$, the absorption at 1780 cm.$^{-1}$, characteristics of γ-lactone rings.

$C_{10}H_{13}NO_4$ (211,22)—Computed (percent): C, 56.9; H, 6.2; N, 6.6; O, 30.3. Found (percent): C, 56.4; H, 6.5; N, 6.6; O, 30.4.

EXAMPLE 2

At a temperature of 50° C., under exclusion of moisture and with stirring, there are dissolved 39.2 parts (0.4 mol) of maleic acid anhydride in 300 parts of absolute 1,2-dichloroisobutane, and the solution is combined with a solution of 45.2 parts (0.4 mol) of 2-isopropyl-$\Delta^2$-oxazoline in 100 parts of absolute 1,2-dichloroisobutane. The mixture is heated to approximately 110° C. for 1½ hours. After cooling there are separated 61 parts—and, after concentration of the mother-liquor, 8 additional parts (the total representing 80% of the computed value)—of 11,11 - dimethyl - 2,10 - dioxa - 5-aza-tricyclo [6,2,1,0$^{1,5}$]undecanedion-(6,9), the same being obtained, after washing with absolute diethylether, in the form of colorless crystals.

The physical properties of this compound are identical with the properties of the product described in Example 1.

EXAMPLE 3

Under exclusion of moisture and at a temperature of 50° C. 3.9 parts (0.04 mol) of maleic acid anhydride are dissolved in 30 parts of absolute o-dichlorobenzene, and the solution is combined, under stirring, with 5.1 parts (0.04 mol) of 2-isopropyl-$\Delta^2$-oxazoline. The mixture is then heated to 160° C. for 20 minutes. The solvent is then distilled off and the residue is crystallized by the addition of ethylacetate and finally sucked off. The crystalline product so obtained consists of 5.5 parts of 11,11-dimethyl - 2,10 - dioxa-5-aza-tricyclo[6,2,1,0$^{1,5}$]undecanedion-(6,9), possessing a melting point of 176 to 188° C.

EXAMPLE 4

Under exclusion of moisture and at room temperature there are dissolved 3.9 parts (0.04 mol) of maleic acid anhydride in 25 parts of absolute 1,2-dichloroethane, and the solution is combined, under stirring, with 4.5 parts (0.04 mol) of 2-isopropyl-$\Delta^2$-oxazoline. The reaction mixture is held at room temperature for two days. The solvent is then vacuum-distilled off and is replaced by ethylacetate. After dissolution of the residue and cooling, 11,11 - dimethyl - 2,10 - dioxa-5-aza-tricyclo[6,2,1,0$^{1,5}$] undecanedion -(6,9) crystallizes out in the form of colorless needles.

Yield: 1.7 gram; melting point 174 to 185° C.

EXAMPLE 5

3.9 parts of maleic acid anhydride are dissolved in 4.5 parts of 2-isopropyl-$\Delta^2$-oxazoline. The reaction is strongly exothermic and the temperature of the reaction mixture must not exceed 80° C. The product is dissolved in 1,2-dichloroethane. By-products are precipitated by the addition of a small quantity of ethylacetate, and then the filtrate is condensed and crystallized by use of ethylacetate. The yield is 0.5 gram of 11,11-dimethyl-2,10-dioxa-5-aza-tricyclo[6,2,1,0$^{1,5}$]undecanedion-(6,9) with a melting point of 175 to 185° C.

EXAMPLE 6

Under exclusion of moisture and with stirring there are combined 3.9 parts (0.04 mol) of maleic acid anhydride with 13.5 parts (0.12 mol) of 2-isopropyl-$\Delta^2$-oxazoline. The mixture heats up to approximately 60° C. After cooling, 11,11 - dimethyl-2,10-dioxa-5-aza-tricyclo[6,2,1,0$^{1,5}$] undecanedion-(6,9) crystallizes out in the form of colorless needles. After sucking off and washing with ethylacetate the yield is 4 gram (48% of the computed value) with a melting point of 172 to 185° C. The dissolved and not separated reaction product which remains in the filtrate, together with the excess of 2-isopropyl-$\Delta^2$-oxazoline, can be reused.

EXAMPLE 7

Under exclusion of moisture and at a temperature of 50° C. there are dissolved 39.2 parts (0.4 mol) of maleic acid anhydride in 300 parts of absolute tetrachloroethane, and the solution is combined under stirring with 50.9 parts (0.4 mol) of 2-isopropyl-5-methyl-$\Delta^2$-oxazoline in 80 parts of absolute tetrachloroethane. The mixture is then heated to approximately 110° C. for 1½ hours. Most of the solvent is then distilled off, and the residue is crystallized by cooling. After sucking off, there is obtained a total of 43 parts of 3,11,11-trimethyl-2,10-dioxa-5 - aza - tricyclo[6,2,1,0$^{1,5}$]undecanedion-(6,9). After recrystallization from absolute ethylacetate (or, after sublimation, respectively) the product is obtained in the form of colorless crystals with a melting point of 137 to 139° C. The IR-spectrum of the compound shows—in addition to the amide-CO-band at 1660 cm.$^{-1}$—the absorption at 1780 cm.$^{-1}$ which is characteristic of $\gamma$-lactone rings.

$C_{11}H_{15}NO_4$ (225,2)—Computed (percent): C, 58.6; H, 6.7; N, 6.2; O, 28.4. Found (percent): C, 57.9; H, 6.7; N, 6.2; O, 28.8.

EXAMPLE 8

Under exclusion of moisture and with stirring there is combined a solution of 9.8 parts (0.1 mol) of maleic acid anhydride in 120 parts of absolute 1,2-dichloroethane with 12.7 parts (0.1 mol) of 2-isopropyl-4H-5,6-dihydro-oxazine-(1,3) in 60 parts of absolute 1,2-dichloroethane. The mixture is then heated to boiling for 1½ hours, and the solvent is distilled off under vacuum. The residue is treated with absolute diethylether, freed of insoluble components and concentrated. The yield is 14 grams of a yellow oil; its structural characteristics, as determined spectroscopically, conform with the characteristics of 12,12-dimethyl - 2,11 - dioxa - 6-aza-tricyclo[7,2,1,0$^{1,6}$]dodecanedion-(7,10).

EXAMPLE 9

Under exclusion of moisture and with stirring there is combined a solution of 9.8 parts (0.1 mol) of maleic acid anhydride in 80 parts of absolute 1,2-dichloroethane with 23.1 parts (0.1 mol) of 4,6-dimethyl-2-isopropyl-6-phenyl-4H-5,6-dihydro-oxazine-(1,3) in 50 parts of absolute 1,2-dichloroethane. The mixture is then heated to boiling for 1½ hours, and the solvent is distilled off. The residue is treated with absolute diethylether; the insoluble precipitate is filtered off; and the filtrate is freed of solvent. There remain 24 grams of 3,5,12,12-tetramethyl-3-phenyl-2,11-dioxa-6-aza-tricyclo[7,2,1,0$^{1,6}$]dodecane - dion - (7,10), in the form of a yellowish oil which shows in the IR-spectrum—in addition to the amide-CO-band at 1670 cm.$^{-1}$—the absorption at 1780 cm.$^{-1}$ which is characteristic of $\gamma$-lactone rings.

I claim:

1. Process of preparing a compound of the formulae

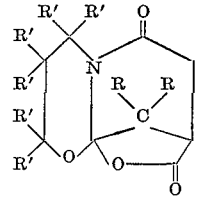 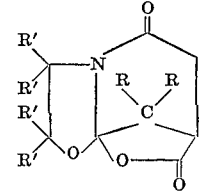

wherein R represents a member of the group consisting of N-alkyl groups having 1 to 5 C-atoms, phenyl-, and cyclohexyl radicals; and R' represents a member of the group consisting of hydrogen and the organic groups methyl- vinyl- and phenyl-, wherein not more than three R's are organic groups, which comprises reacting a compound of the formulae

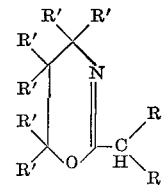 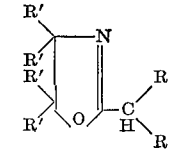

wherein R and R' have the meanings given above, under exclusion of moisture and at a temperature of from 0 to 180° C., with 0.2 to 1 mol—relative to the heterocyclic compound employed—of maleic acid anhydride.

2. Process according to claim 1, wherein the reaction is carried out in the presence of an invert solvent.

3. A compound of the formulae

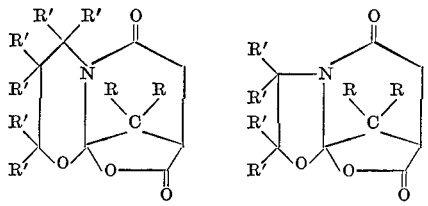

wherein R represents a member of the group consisting of N-alkyl groups having 1 to 5 C-atoms, phenyl-, and cyclohexyl radicals; and R' represents a member of the group consisting of hydrogen and the organic groups methyl-, vinyl- and phenyl-, wherein not more than three of the R's are organic groups.

4. 11,11 - dimethyl - 2,10 - dioxa - 5-aza-tricyclo[6,2,1,0$^{1,5}$]undecane dion-(6,9).

5. 3,11,11 - trimethyl - 2,10 - dioxa - 5 - aza-tricyclo [6,2,1,0$^{1,5}$]undecanedion-(6,9).

References Cited
UNITED STATES PATENTS 3,361,742   1/1968   Berger et al. _ _ _ _ _ _   260—239.3

HENRY R. JILES, Primary Examiner
R. T. BOND, Assistant Examiner

U.S. Cl. X.R.
260—244, 294.3, 307, 999; 71—94

PO-1050
(5/69)

UNITED STATES PATENT OFFICE
CERTIFICATE OF CORRECTION

Patent No. 3,573,281          Dated  March 30, 1971

Inventor(s)   RUDOLF NEHRING

It is certified that error appears in the above-identified patent and that said Letters Patent are hereby corrected as shown below:

Claim 2, last line, change the word "invert" to

-- inert --

Signed and sealed this 22nd day of June 1971.

(SEAL)
Attest:

EDWARD M. FLETCHER, JR.
Attesting Officer

WILLIAM E. SCHUYLER,
Commissioner of Paten